(12) United States Patent
Lin

(10) Patent No.: US 11,176,643 B1
(45) Date of Patent: Nov. 16, 2021

(54) CIRCUIT FOR CORRECTING CHROMATIC ABERRATION THROUGH SHARPENING

(71) Applicant: Apple Inc., Cupertino, CA (US)

(72) Inventor: Sheng Lin, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/865,883

(22) Filed: May 4, 2020

(51) Int. Cl.
*G06T 7/90* (2017.01)
*G06T 5/00* (2006.01)

(52) U.S. Cl.
CPC ............... *G06T 5/003* (2013.01); *G06T 7/90* (2017.01); *G06T 2207/10024* (2013.01)

(58) Field of Classification Search
CPC .. G06T 5/003; G06T 7/90; G06T 2207/10024
USPC ........................................................ 382/162
See application file for complete search history.

(56) References Cited

U.S. PATENT DOCUMENTS

| | | | |
|---|---|---|---|
| 7,020,343 B1* | 3/2006 | Avinash | G06T 5/002 382/172 |
| 8,406,559 B2 | 3/2013 | Wu | |
| 8,730,329 B2* | 5/2014 | Jiang | H04N 17/002 348/187 |
| 9,031,319 B2 | 5/2015 | Cote et al. | |
| 9,384,533 B2 | 7/2016 | Shin et al. | |
| 2003/0035653 A1* | 2/2003 | Lyon | H04N 1/46 396/429 |
| 2003/0189579 A1 | 10/2003 | Pope | |
| 2004/0212688 A1* | 10/2004 | Takano | H04N 9/0451 348/218.1 |
| 2004/0218073 A1* | 11/2004 | Kalevo | H04N 9/04515 348/272 |
| 2008/0298708 A1* | 12/2008 | Ovsiannikov | H04N 9/04557 382/261 |
| 2017/0024863 A1* | 1/2017 | Sugimoto | H04N 5/23229 |

\* cited by examiner

*Primary Examiner* — Ali Bayat
(74) *Attorney, Agent, or Firm* — Fenwick & West LLP

(57) ABSTRACT

Embodiments relate to axial chromatic aberration (ACA) reduction of raw image data generated by image sensors. A chromatic aberration reduction circuit performs chromatic aberration reduction on the raw image data to correct the ACA in the full color images through sharpening that has been clamped to reduce sharpening overshoot.

20 Claims, 8 Drawing Sheets

CIRCUIT FOR CORRECTING CHROMATIC ABERRATION THROUGH SHARPENING

BACKGROUND

1. Field of the Disclosure

The present disclosure relates to a circuit for processing images and more specifically to a circuit for performing chromatic aberration reduction on images through image sharpening.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to performing one or more image processing algorithms.

When a wide-angle lens (e.g., a fisheye lens) is used to generate the image data, the refraction angle of light with different wavelength varies thereby manifesting itself on the image sensor as shifted focal points that are not aligned among red, green, and blue color channels. Thus, color fringing is present at sharp and high contrast edges of full-color images generated from the image data.

SUMMARY

Embodiments of the present disclosure relate to a circuit for correcting axial chromatic aberration generated by image sensors. In one embodiment, an image processor circuit receives pixel values of pixels of a color in raw input image data. The image processor circuit generates sharpening values for the received pixel values that improve sharpness of the corresponding pixels thereby reducing chromatic aberrations. However, the sharpening values may over sharpen the pixel values resulting in artifacts in a full-color image generated based on the sharpening values. To reduce the artifacts, the image processor circuit clamps the amount of sharpening that is applied to the pixel values. By clamping the sharpening, the image processor circuit reduces sharpening overshoot that results in the artifacts while also correcting axial chromatic aberrations due to the usage of a wide-angle lens to generate the raw input image data.

BRIEF DESCRIPTION OF THE DRAWINGS

Figure (FIG. 1 is a high-level diagram of an electronic device, according to one embodiment FIG. 2 is a block diagram illustrating components in the electronic device, according to one embodiment.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to axial chromatic aberration (ACA) reduction of raw image data generated by image sensors. In one embodiment, raw image data may be in a Bayer color filter array (CFA) pattern (hereinafter also referred to as a "Bayer pattern"). A full-color image created from a Bayer pattern that is generated by an image sensor using a wide-angle lens typically has ACA and lateral chromatic aberration (LCA). For a wide-angle lens, the refraction angle for light with different wavelengths varies and manifests itself on image sensors as shifted focal points that are misaligned among red, green, and blue color channels and results in color fringing at sharp and high contrast edges in the full color image. A chromatic aberration reduction circuit performs chromatic aberration reduction on raw image data captured with the wide-angle lens to correct the resulting ACA in the full color images through image sharpening that has been clamped to also reduce artifacts due to sharpening overshoot.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
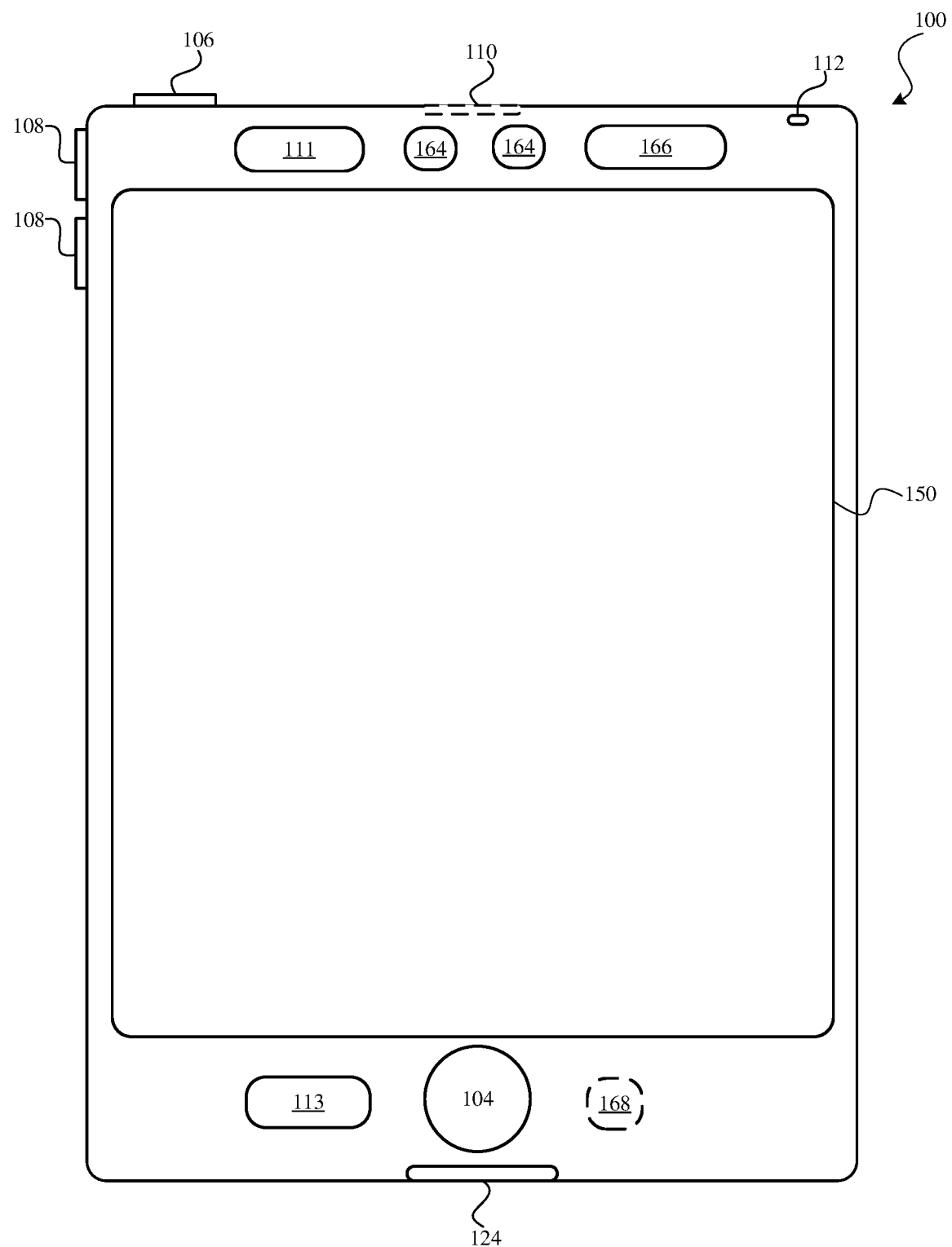

Figure (FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition or alternatively, the image sensors 164 may be associated with different lens configuration. For example, device 100 may include rear image sensors, one with a wide-angle lens and another with as a telephoto lens. The device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
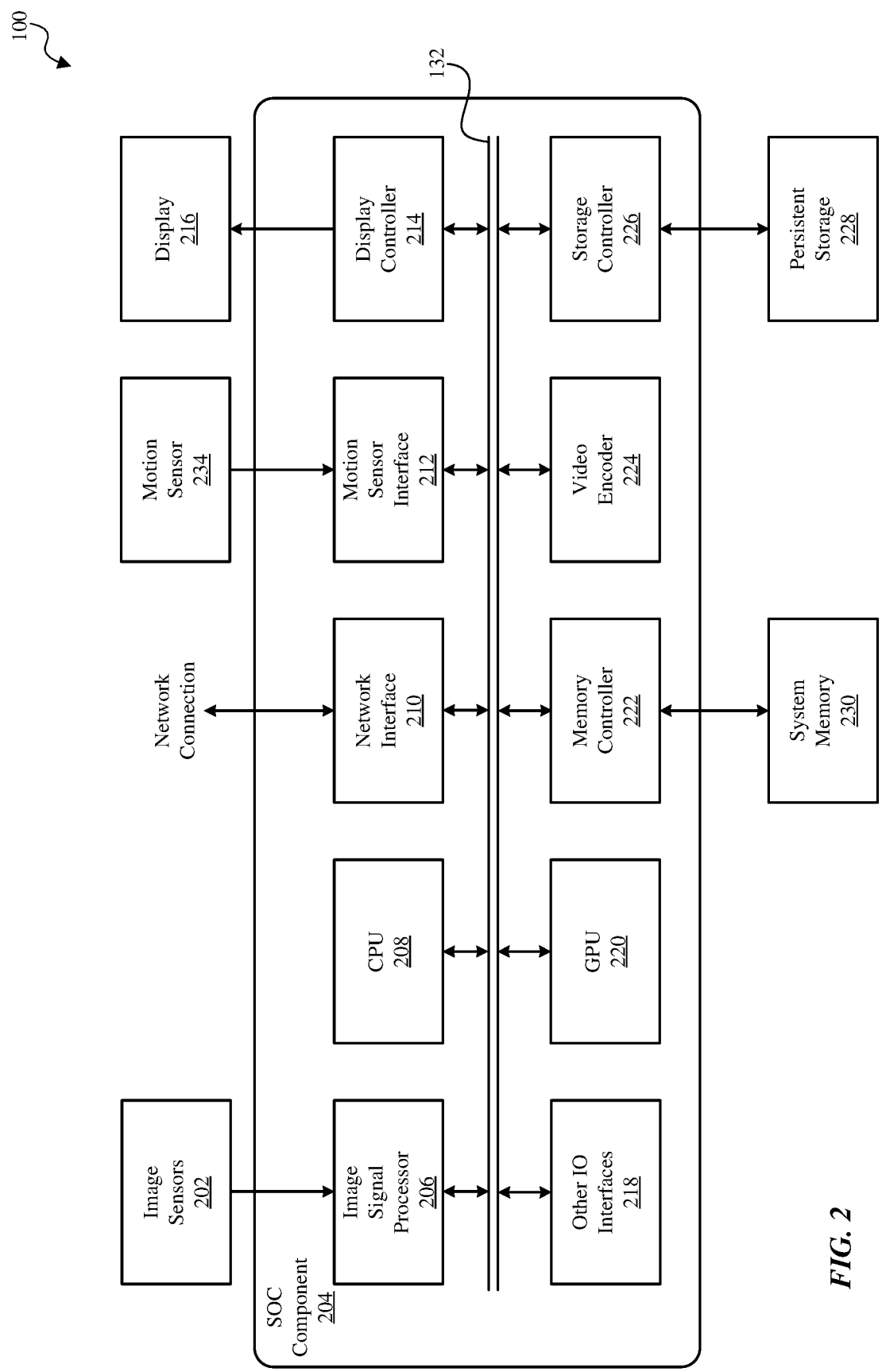

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensors 202 are components for capturing image data. Each of the image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. Image data in a Bayer pattern or other patterns that have a monochromatic color value for each pixel may be referred to as "raw image data" herein. An image sensor 202 may also include optical and mechanical components that assist image sensing components (e.g., pixels) to capture images. The optical and mechanical components may include an aperture, a lens system, and an actuator that controls the lens position of the image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, a liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing operations on graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface 210 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensors 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
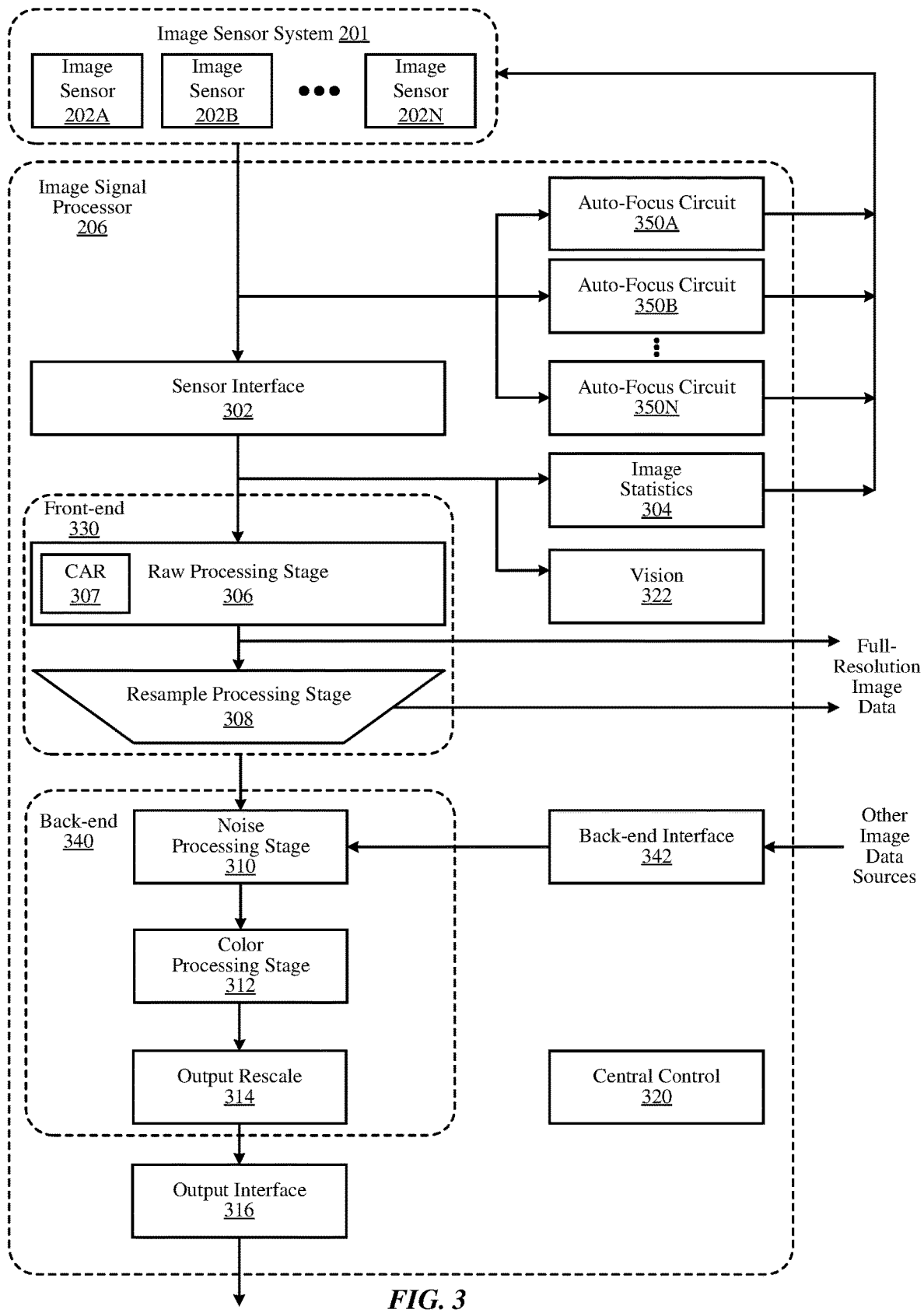
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. The image sensor system 201 may include one or more sub-systems that control the image sensors 202 individually. In some cases, each image sensor 202 may operate independently while, in other cases, the image sensors 202 may share some components. For example, in one embodiment, two or more image sensors 202 may share the same circuit board that controls the mechanical components of the image sensors (e.g., actuators that change the lens positions of each image sensor). The image sensing components of an image sensor 202 may include different types of image sensing components that may provide raw image data in different forms to the ISP 206. For example, in one embodiment, the image sensing components may include a plurality of focus pixels that are used for auto-focusing and a plurality of image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 processes 2 pixels per clock cycle, then raw processing stage 306 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle).

Raw image data captured by image sensors 202 may be transmitted to different components of ISP 206 in different manners. In one embodiment, raw image data corresponding to the focus pixels may be sent to the auto-focus circuits 350 while raw image data corresponding to the image pixels may be sent to the sensor interface 302. In another embodiment, raw image data corresponding to both types of pixels may simultaneously be sent to both the auto-focus circuits 350 and the sensor interface 302.

Auto-focus circuits 350 may include hardware circuits that analyze raw image data to determine an appropriate lens position of each image sensor 202. In one embodiment, the raw image data may include data that is transmitted from image sensing pixels that specialize in image focusing. In another embodiment, raw image data from image capture pixels may also be used for auto-focusing purpose. An auto-focus circuit 350 may perform various image processing operations to generate data that determines the appropriate lens position. The image processing operations may include cropping, binning, image compensation, scaling to generate data that is used for auto-focusing purpose. The auto-focusing data generated by auto-focus circuits 350 may be fed back to the image sensor system 201 to control the lens positions of the image sensors 202. For example, an image sensor 202 may include a control circuit that analyzes the auto-focusing data to determine a command signal that is sent to an actuator associated with the lens system of the image sensor to change the lens position of the image sensor. The data generated by the auto-focus circuits 350 may also be sent to other components of the ISP 206 for other image processing purposes. For example, some of the data may be sent to image statistics 304 to determine information regarding auto-exposure.

The auto-focus circuits 350 may be individual circuits that are separate from other components such as image statistics 304, sensor interface 302, front-end 330 and back-end 340. This allows the ISP 206 to perform auto-focusing analysis independent of other image processing pipelines. For example, the ISP 206 may analyze raw image data from the image sensor 202A to adjust the lens position of image sensor 202A using the auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of the image sensor 202. The device 100 may perform auto focusing for different image sensors 202 even if one or more image sensors 202 are not in active use. This allows a seamless transition between two image sensors 202 when the device 100 switches from one image sensor 202 to another. For example, in one embodiment, a device 100 may include a wide-angle camera and a telephoto camera as a dual back camera system for photo and image processing. The device 100 may display images captured by one of the dual cameras and may switch between the two cameras from time to time. The displayed images may seamlessly transition from image data captured by one image sensor 202 to image data captured by another image sensor without waiting for the second image sensor 202 to adjust its lens position because two or more auto-focus circuits 350 may continuously provide auto-focus data to the image sensor system 201.

Raw image data captured by different image sensors 202 may also be transmitted to sensor interface 302. Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (e.g., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing the noise of image data by averaging neighbor pixels that are similar in brightness.

Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Chromatic aberration reduction is performed by chromatic aberration reduction circuit (CAR) 307 and refers to correcting chromatic aberrations in raw image data images resulting from the use of a wide-angle lens to generate the images. Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, resample processing stage 308 converts RGB format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), histograms (e.g., 2D color or component) and any other image data information may be collected or tracked. In some embodiments, certain pixels' values, or areas of pixel values may be excluded from collections of certain statistical data when preceding operations identify clipped pixels. Although only a single statistics module 304 is illustrated in FIG. 3, multiple image statistics modules may be included in ISP 206. For example, each image sensor 202 may correspond to an individual image statistics unit 304. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of image and a kernel.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (e.g. no color). In some embodiment, the luma sharpening and chroma suppression may be performed simultaneously with spatial noise filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame and thus the reference frame is not spatially filtered).

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three-dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional input coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement a series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Chromatic Aberration Reduction

Figure 4B:
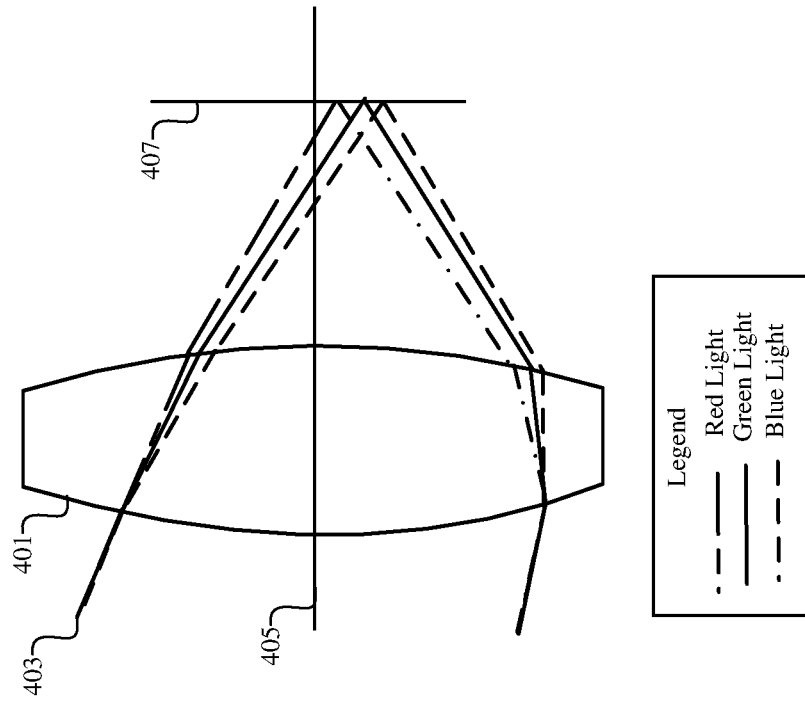
FIGS. 4A and 4B are conceptual diagrams illustrating longitudinal/axial chromatic aberration and lateral/transverse chromatic aberration, according to one embodiment.
Figure 4A:
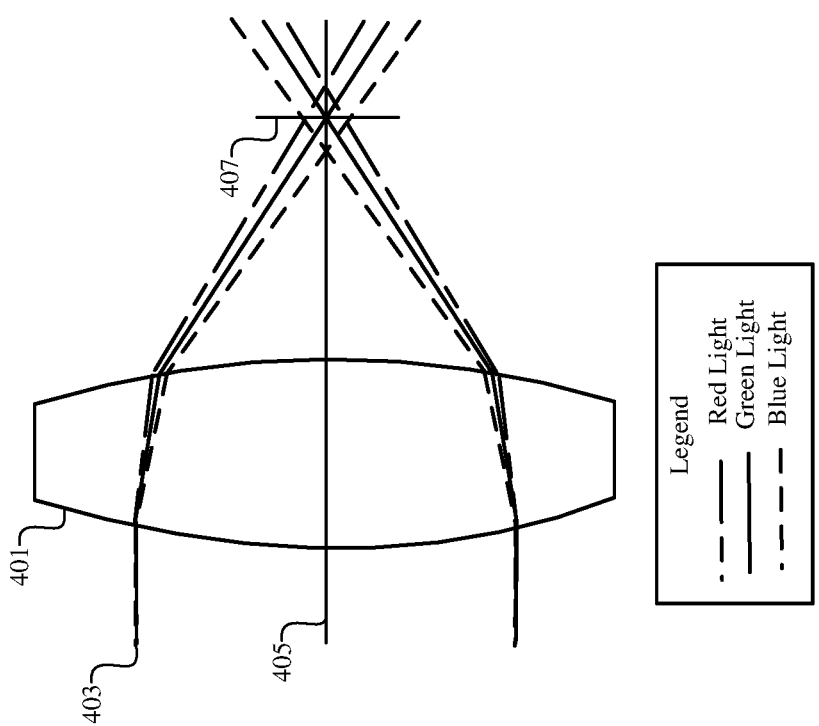

In general, chromatic aberration is caused by the inability of a lens to focus different wavelengths of light (different colors of light) to the same point. FIG. 4A illustrates an example of longitudinal (axial) chromatic aberration. As shown in FIG. 4A, wide-angle lens 401 refracts light 403 such that different wavelengths of light (e.g., red light, green light, and blue light) are focused at different distances from the wide-angle lens 401 along the optical axis 405. FIG. 4B illustrates lateral (transverse) chromatic aberration, according to one embodiment. As shown in FIG. 4B, the wide-angle lens 401 refracts light 403 such that the different wavelengths (e.g., red light, green light, and blue light) are focused at different positions on the focal plane 407. Chromatic aberration due to the usage of the wide-angle lens 401 as described with respect to FIGS. 4A and 4B manifests itself as color fringing at edges in full color images.

Figure 5:
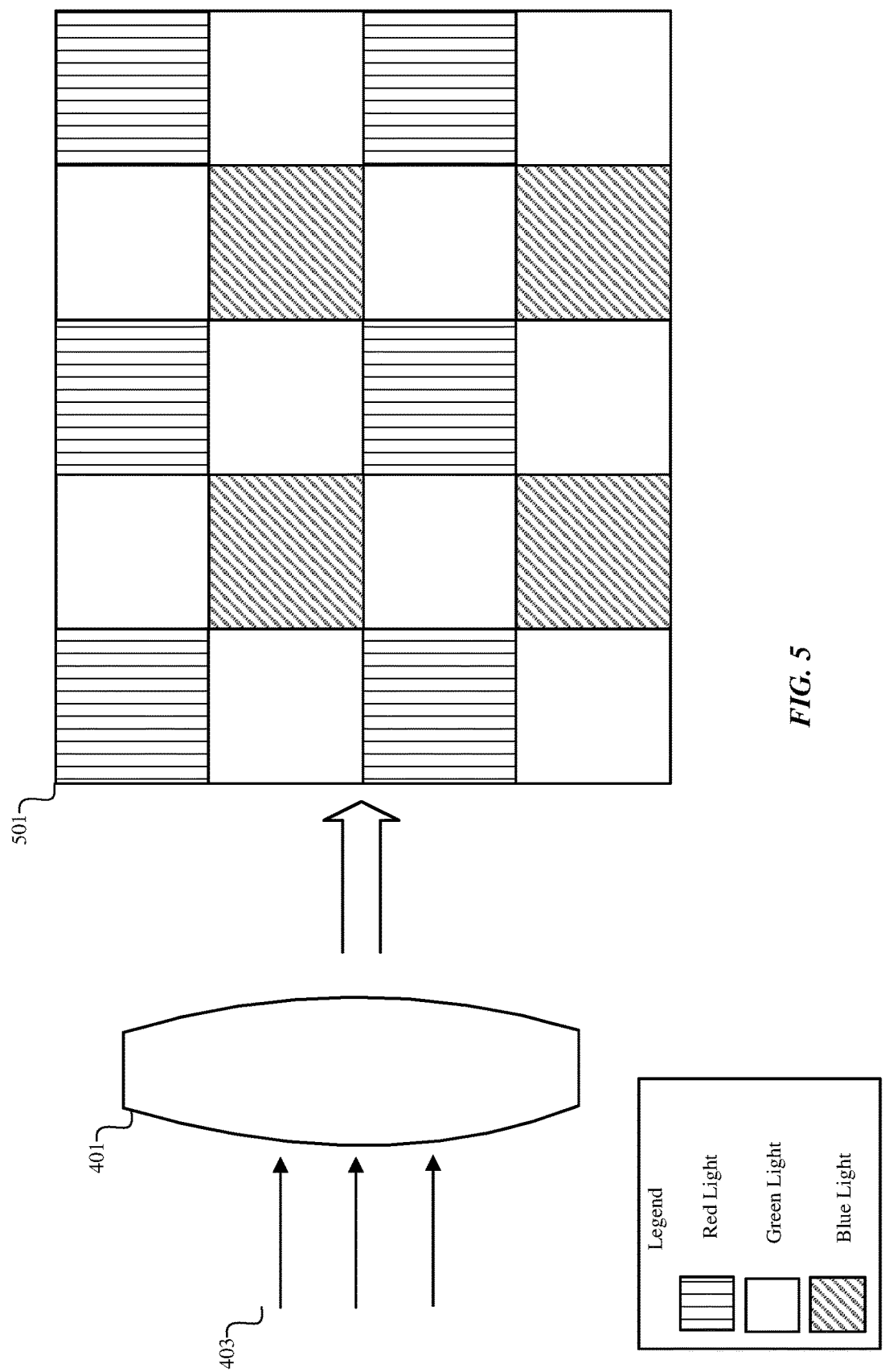
FIG. 5 is a conceptual diagram illustrating raw image data generated by an image sensor using a wide-angle lens, according to one embodiment.

FIG. 5 illustrates raw image data generated using light 403 captured by image sensor 202 using the wide-angle lens 401 in one embodiment. As shown in FIG. 5, the raw image data is in a Bayer pattern 501. The Bayer pattern 501 includes alternating rows of red-green pixels and green-blue pixels. Generally, the Bayer pattern 501 includes more green pixels than red or blue pixels due to the human eye being more sensitive to green light than both red light and blue light.

Figure 6:
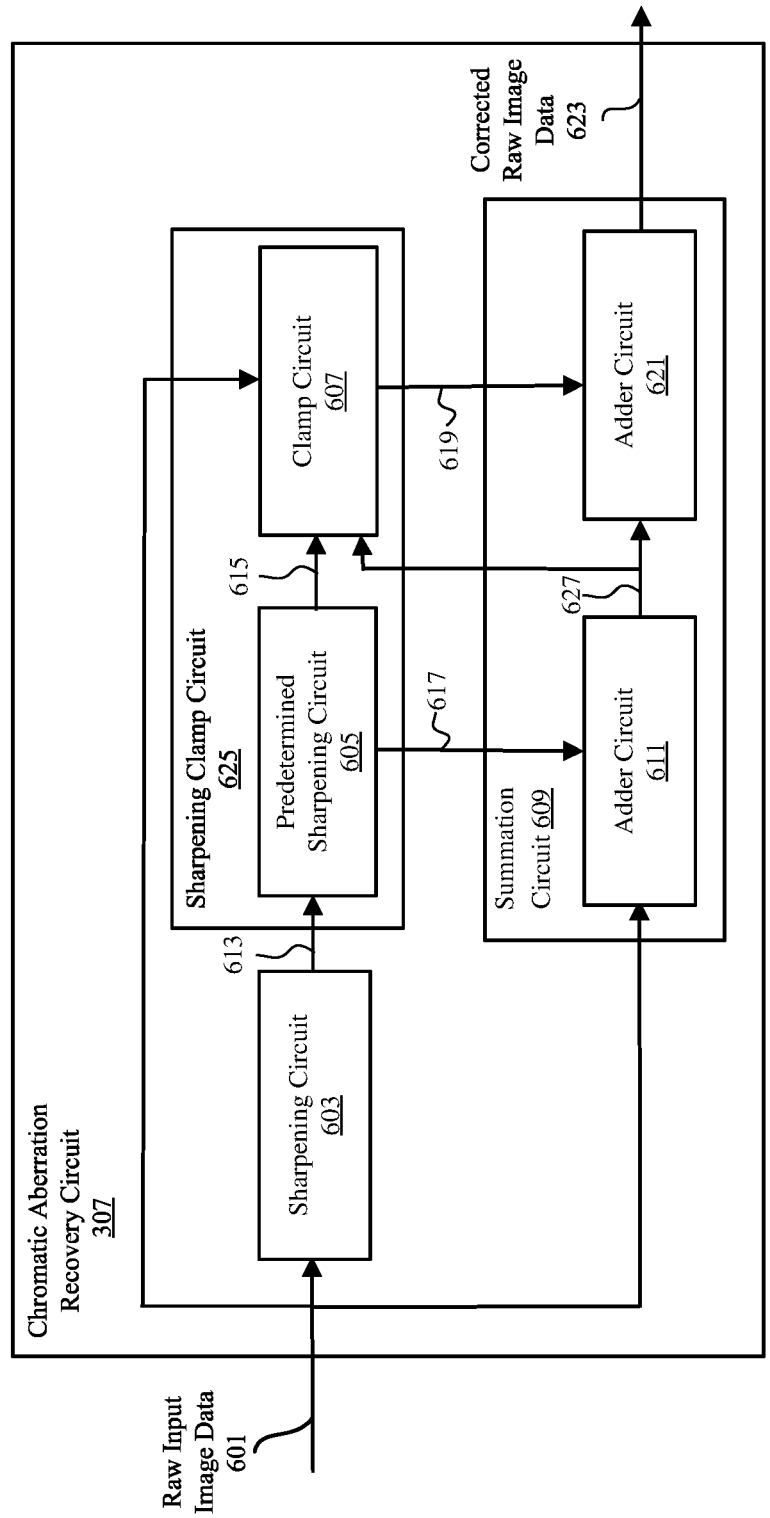
FIG. 6 is a block diagram illustrating a detailed view of a chromatic aberration reduction (CAR) circuit, according to one embodiment.

FIG. 6 is a block diagram illustrating a detailed view of the chromatic aberration reduction (CAR) circuit 307, according to one embodiment. The CAR circuit 307 receives raw input image data 601 and generates corrected raw image data 623 by correcting axial chromatic aberrations. In one embodiment, the raw input image data 601 is a Bayer pattern that is generated by image sensor 202 using a wide-angle lens as described with respect to FIG. 5. A full-color image generated from the raw input image data 601 includes axial chromatic aberrations due to using the wide-angle lens to generate the raw input image data 601. By using the corrected raw image data 623 to generate a full-color image rather than the raw input image data 601, axial chromatic aberrations in the full-color image is reduced. The following embodiments are described primarily with the CAR circuit 307 receiving raw input image data 601. However, the CAR circuit 307 may also receive processed image data (for example, in RGB or YCbCr format) and generate corrected image data by correcting chromatic aberrations.

In one or more embodiments, the CAR circuit 307 includes a sharpening circuit 603, sharpening clamp circuit 625, and a summation circuit 609. The CAR circuit 307 may have additional or fewer circuits than those shown in FIG. 6.

The sharpening circuit 603 receives the raw input image data 601. In one embodiment, the raw input image data 601 includes pixel values for each pixel in the raw input image data 601. Sharpening circuit 603 is a circuit that performs edge sharpening on the raw input image data 601 (first in vertical direction followed by horizontal direction) and generates a delta value 613 (a sharpening value for each direction) as its output to the sharpening clamp circuit 625. Delta values 613 represent a measure of sharpening performed on the raw input image data 601 by the sharpening circuit 603. The measure of sharpening performed on the raw input image data 601 by the sharpening circuit 603 represents the highest degree of sharpening applied to the raw input image data 601 without clamping the degree of sharpening. Each delta value 613 generated by the sharpening circuit 603 corresponds to one pixel in the raw input image data 601. In one or more embodiments, sharpening circuit 603 is embodied as a bilateral filter or a high-pass filter that performs processing on the raw input image data 601. Thus, for example, delta value 613 may be a high frequency component of the raw input image data 601.

In one embodiment, the delta value 613 for each pixel (e.g., each red and blue pixel) describes the pixel value difference between the sharpened pixel value generated by the sharpening circuit 603 for the pixel and the original pixel value included in the raw input image data 601. Referring to the example of FIG. 7 described below in detail, the raw input image data 601 includes a pixel value for blue pixel E which is processed by the sharpening circuit 604 to generate a delta value 613 for the blue pixel E that describes the difference between the sharpened blue pixel value and the original blue pixel value for pixel E included in the raw input image data 601.

In one embodiment, the sharpening circuit 603 performs sharpening on the raw input image data 601 and may sharpen a subset of the colors of the raw input image data, using an image sharpening technique well known in the art. Assuming that the raw input image data 601 includes pixel values for three colors (e.g., red, green, and blue), the sharpening circuit 603 sharpens pixel values of pixels of two of the colors without sharpening pixel values of pixels of a remaining color in one embodiment. For example, in the description herein, the sharpening circuit 603 sharpens pixel values of red and blue pixels without sharpening pixel values of green pixels. However, in other embodiments, the sharpening circuit 603 may sharpen pixel values of green pixels and pixel values of red or blue pixels without sharpening pixels of the remaining color.

The sharpening clamp circuit 625 receives the delta values 613 generated by the sharpening circuit 603 and clamps the degree of sharpening in the delta values 613. That is, the sharpening clamp circuit 625 limits the degree of sharpening applied by the sharpening circuit on the raw input image data 601 to reduce sharpening overshoot. The sharpening clamp circuit 625 includes a predetermined sharpening circuit 605 and a clamp circuit 607 as shown in FIG. 6. However, in other embodiments the sharpening clamp circuit 625 may include other circuits than those shown in FIG. 6.

In one embodiment, the predetermined sharpening circuit 605 applies a predetermined sharpening strength to each delta value 613 received from the sharpening circuit 603 to generate a predetermined sharpening value 617 for each delta value 613. The predetermined sharpening strength describes the predetermined amount of sharpening that should be applied to the raw input image data 601. In one embodiment, the predetermined sharpening strength describes a minimum amount of sharpening to apply to the raw input image data 601. In one embodiment, the predetermined sharpening strength is a value stored in register of the predetermined sharpening circuit 605. The predetermined sharpening strength 617 may be configurable by software or user setting.

In one embodiment, the predetermined sharpening circuit 605 generates the predetermined sharpening value 617 for each delta value 613 based on a product of the delta value 613 and the predetermined sharpening strength. As shown in FIG. 6, the predetermined sharpening circuit 605 outputs the predetermined sharpening value 617 for each delta value 613 to the summation circuit 609.

Furthermore, the predetermined sharpening circuit 605 also generates a residual delta value 615 for each delta value 613 received from the sharpening circuit 603. The residual delta value 615 for each delta value 613 is a difference between the delta value 613 and the predetermined sharpening value 617. In one embodiment, the predetermined sharpening circuit 605 outputs the residual delta value 615 for each delta value 613 to the clamp circuit 607 as shown in FIG. 6.

The summation circuit 609 includes an adder circuit 611 and an adder circuit 621. Adder circuit 611 generates an adjusted raw pixel value 627 for each target pixel from the raw input image data 601 (each red and blue pixel). In one embodiment, the adder circuit 611 generates the adjusted raw pixel value 627 for each target pixel by adding together (summing) the pixel value of the target pixel and the predetermined sharpening value 617 that corresponds to the delta value 613 for the target pixel.

Referring back to the sharpening clamp circuit 625, the clamp circuit 607 clamps (e.g., limits) the degree of sharpening applied to the raw image data 601 by the sharpening circuit 603. By clamping the degree of sharpening applied to the raw image data 601, the clamp circuit 607 reduces sharpening overshoot which results in artifacts in the full-color image generated from the corrected raw image data 623.

The clamp circuit 607 generates a clamped delta value 619 for each residual delta value 615 received from the predetermined sharpening circuit 605. The clamped delta value 619 describes the amount (e.g., degree) of sharpening to apply to a pixel value from the raw input image data 601. In one embodiment, the clamp circuit 607 generates the clamped delta value 619 for each target pixel based on the residual delta value 615 for the target pixel, the adjusted raw pixel value 627 for the target pixel, and pixel values of the target pixel's neighboring pixels.

A target pixel's neighbors include vertical pixel neighbors and horizontal pixel neighbors. The vertical pixel neighbors of a target pixel include multiple pixels of a same color as the target pixel in the vertical direction (e.g., a first direction). In one embodiment, the vertical pixel neighbors include four pixels, but any number of pixels may be used. The horizontal pixel neighbors of the target pixel include multiple green pixels that are immediately adjacent to the target pixel in the horizontal direction (e.g., a second direction). The horizontal pixel neighbors include two pixels in one embodiment. The horizontal pixel neighbors of the target pixel are green pixels regardless of the target pixel's color. Thus, the horizontal pixel neighbors of a red target pixel are green pixels and the horizontal pixel neighbors of a blue target pixel are also green pixels.

Figure 7:
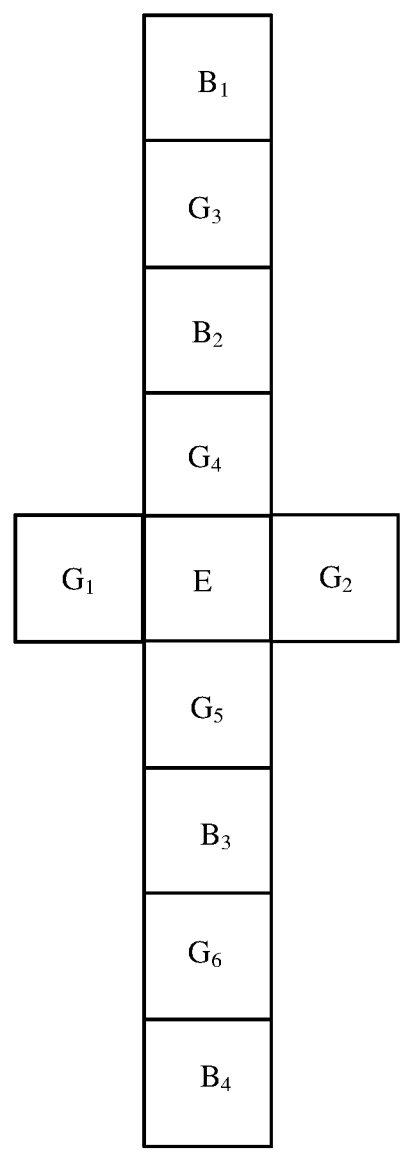
FIG. 7 is a diagram illustrating pixel neighbors of a given pixel, according to one embodiment.

FIG. 7 illustrates the neighboring pixels of target pixel E for vertical sharpening. The vertical pixel neighbors of target pixel E include multiple pixels in the vertical direction that are closest to the target pixel E and are of the same color as the target pixel. In this example, the vertical pixel neighbors of target pixel E include blue pixels $B_1$, $B_2$, $B_3$, and $B_4$, and the horizontal pixel neighbors of target pixel E. The horizontal pixel neighbors of target pixel E are the green pixels $G_1$ and $G_2$ that are immediately adjacent to the target pixel E in the horizontal direction. Note that the target pixel E will also have neighboring pixels for horizontal sharpening with horizontal pixel neighbors of target pixel E including multiple pixels in the horizontal direction that are of the same color as the target pixel E and vertical pixel neighbors of target pixel E are the green pixels that are immediately adjacent to the target pixel E in the vertical direction.

Referring back to FIG. 6, the clamp circuit 607 generates a clamped delta value 619 for a target pixel based on the following factors: 1) the lowest pixel value of the target pixel's vertical neighbors, 2) the highest pixel value of the target pixel's vertical neighbors, 3) an average pixel value of the target pixel's horizontal neighbors, 4) the adjusted raw pixel value 627 for the target pixel, and 5) the residual delta value 615 for the target pixel. The clamp circuit 607 determines the locations of the target pixel's vertical neighbors based on the Bayer pattern arrangement of the raw image data 601. After the vertical neighbors of the target pixel are identified, the clamp circuit 607 identifies the lowest pixel value and the highest pixel value from the pixel values of the vertical neighbors of the target pixel. In the example of FIG. 7, the clamp circuit 607 determines the lowest pixel value and the highest pixel value amongst the pixel values from blue pixels $B_1$, $B_2$, $B_3$, and $B_4$ which are the vertical pixel neighbors of target pixel 701.

In one embodiment, the clamp circuit 607 calculates a weighted green value $G_w$ based on the target pixel's horizontal pixel neighbors according to Equation 1:

$$G_w = G_1 + G_2/2 \cdot F_{gain} \qquad (1)$$

where $F_{gain}$ represents gain, $G_1$ and $G_2$ represents the pixel values of the target pixel's neighboring green pixels. In one embodiment, gain $F_{gain}$ is the ratio of white balance gain on green to white balance gain on a color component of target pixel E when white balance gain has not been applied to the raw input image data 601. Gain $F_{gain}$ is calculated by the CPU based on a white balance analysis of the raw input image data 601 from the statistics data collected by the image statistics module 304. Due to the image sensor 202's different sensitivity to different colors, green pixels have higher pixel values then red pixels and blue pixels. To make a neutral color (e.g., gray) have the same red, blue, and green values, different white balance gain is applied to different colors. For example, higher gain is used for red and blue pixels compared to green pixels. Since green pixel values are used to clamp pixel values of red or blue pixels, inverse white balance gain is applied to green pixel values so that when white balance gain is later applied, a neutral color would still be neutral. However, if white balance gain is applied before, $F_{gam}$ would be set to 1. In some embodiments, the weighted green value $G_w$ is directly proportional to a weighted value of gain $F_{gain}$. In some embodiments, the weighted green value $G_w$ is directly proportional to a weighted value of $G_1$ and $G_2$ respectively, or in combination.

The clamp circuit 607 generates the clamp delta value 619 for each pixel (e.g., red and blue pixels) based on the lowest and highest pixel values of the target pixel's vertical neighboring pixels, the weighted green value $G_w$, the residual delta value 615 for the target pixel, the adjusted raw pixel value 627 for the target pixel, and the residual delta value 615 for the target pixel according to either Equation 2 or 3 shown below.

$$\text{if(adjustedRawPixelValue} > G_w) \text{ and(residualDelta-} \\ \text{Value} < 0) \text{clampedDeltaValue=highest(residu-} \\ \text{alDeltaValue,highest}(G_w, \text{lowestVerticalNeigh-} \\ \text{bor})-\text{adjustedRawPixelvalue)} \qquad (2)$$

$$\text{if(adjustedRawPixelValue} < G_w) \text{ and(residualDelta-} \\ \text{Value} > 0) \text{clampedDeltaValue=lowest(residu-} \\ \text{alDeltaValue,lowest}(G_w, \text{highestVerticalNeigh-} \\ \text{bor})-\text{adjustedRawPixelValue)} \qquad (3)$$

If the adjusted raw pixel value for a target pixel is greater than the weighted green value $G_w$ of the target pixel's green pixel neighbors and the residual delta value 615 for the target pixel is less than zero, the clamp circuit 607 generates the clamped delta value 619 according to Equation 2 shown above. However, if the adjusted raw pixel value for a target pixel is less than the weighted green value $G_w$ of the target pixel's green pixel neighbors and the residual delta value 615 for the target pixel is greater than zero, the clamp circuit 607 generates the clamped delta value 619 according to Equation 3 shown above. If the conditions of Equation 2 and Equation 3 are not satisfied, the clamp circuit 607 outputs a value of zero as the clamped delta value 619. That is, the clamp circuit 607 will maximally clamp the degree of residual sharpening applied to each pixel value included in the raw input image data 601.

In one embodiment, the clamp circuit 607 outputs the clamped delta value 619 for each target pixel to the adder circuit 621 included in the summation circuit 609. The adder circuit 621 is an adder that adds the adjusted raw pixel value 627 of each target pixel from the raw input image data 601 with its corresponding clamped delta value 619 output by the clamp circuit 607 to generate the corrected raw image data 623 for the target pixel. The corrected raw image data 623 for a target pixel is a sharpened pixel value for the target pixel that is clamped to reduce sharpening overshoot as well as to reduce ACA. The corrected raw image data 623 for the subset of pixels from the raw image data 623 (e.g., red and blue pixels) and the raw input image data 601 for the remaining color of pixels that was not corrected (e.g., green pixels) can be used by the image signal processor 206 to generate a full-color image with reduced axial chromatic aberrations.

Figure 8:
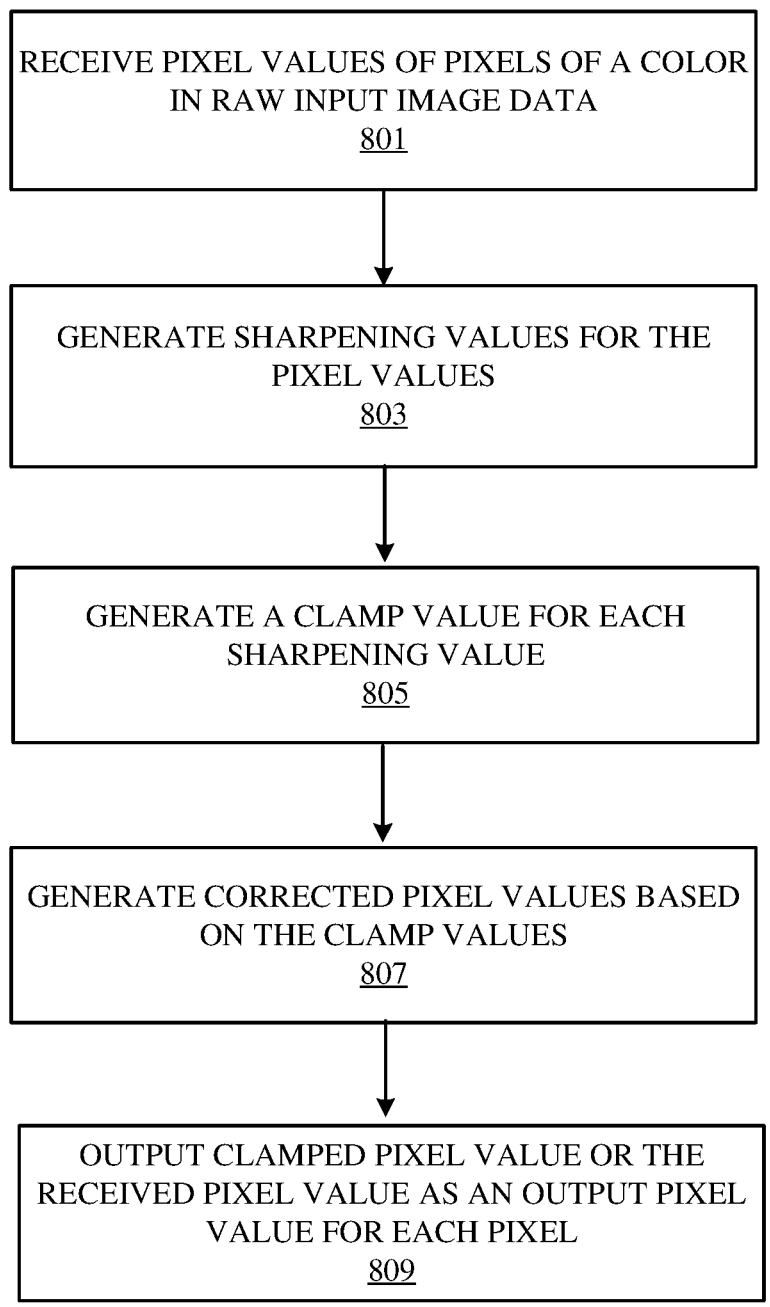
FIG. 8 is a flowchart illustrating a method of performing chromatic aberration reduction to reduce color fringing of raw image data, according to one embodiment.

FIG. 8 is a flowchart illustrating a method of performing axial chromatic aberration reduction to reduce color fringing of raw image data, according to one embodiment. The steps of the method may be performed in different orders, and the method may include different, additional, or fewer steps.

In one embodiment, CAR circuit 307 receives 801 pixel values of pixels of a color in raw input image data. The color may be red or blue, but not green for example. The CAR circuit 307 generates 803 sharpening values for the pixel values. The sharpening values for the pixel values reduce axial chromatic aberrations in the full-color image. However, the sharpening values may over sharpen the image resulting in artifacts (e.g., artificial colors) in the full-color image. Thus, the CAR circuit 307 generates 805 a clamp value for each sharpening value that limits the amount of sharpening applied to each pixel value.

The CAR circuit 307 generates 807 corrected pixel values for the red and blue pixels in the raw image data based on the clamp values. The corrected pixel values for the red and blue pixels are sharpened pixel values that reduce the axial chromatic aberration while also reducing artifacts from over sharpening. The CAR circuit 307 then outputs 809 for each red and blue pixel either the corrected pixel value or the received pixel value in the raw input image data as an output value for the red and blue pixel.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

The invention claimed is:

1. An image processor comprising:
a first sharpening circuit configured to:
receive pixel values of pixels of a color in a raw input image data; and
generate for each of the received pixel values a sharpening value that increases sharpness of the corresponding pixel;
a sharpening clamp circuit coupled to the first sharpening circuit and configured to receive the sharpening value for each of the received pixel values from the first sharpening circuit, and generate a clamped value for each of the received pixel values as a function of the sharpening value for the corresponding pixel value, the clamped value limiting a degree of sharpening applied to each pixel value; and
a summation circuit coupled to the first sharpening circuit and the sharpening clamp circuit, the summation circuit configured to generate for each received pixel value a corresponding corrected pixel value as a function of the received pixel value and the clamped value associated with the received pixel value, and output the corresponding corrected pixel value.

2. The image processor of claim 1, wherein the sharpening clamp circuit comprises:
a second sharpening circuit coupled to the first sharpening circuit, and configured to generate a residual delta value for each received pixel value based on a difference between the sharpening value for each received pixel value and a product of a predetermined sharpening strength for all of the pixel values and the sharpening value; and
a clamp circuit coupled to the second sharpening circuit, and configured to receive the residual delta value for each received pixel value, and generate the clamped value for each of the received pixel values as a function of the residual delta value.

3. The image processor of claim 2, wherein the clamp circuit is configured to generate the clamped value for each of the received pixel values based on pixel values of a plurality of neighboring pixels in a first direction that are of a same color as the pixel corresponding to the received pixel value, and pixel values of a plurality of neighboring pixels in a second direction that are of a different color than the pixel.

4. The image processor of claim 3, wherein the clamp circuit is configured to generate the clamp value for each of the received pixel values by:
determining a highest pixel value from the pixel values of the plurality of neighboring pixels in the first direction;
determining a lowest pixel value from the pixel values of the plurality of neighboring pixels in the first direction; and
calculating a weighted average pixel value of the plurality of pixels in the second direction as a function of pixel values of the plurality of pixels and a white balance gain;
wherein the clamped value for each of the received pixel values is generated as a function of the highest pixel value, the lowest pixel value, the weighted average pixel value that corresponds to the received pixel value, and the residual delta value.

5. The image processor of claim 4, wherein the summation circuit is configured to generate for each received pixel value the corrected pixel value by summing the received pixel value, the product of the predetermined sharpening strength and the sharpening value for the pixel value, and the clamped value for the received pixel value.

6. The image processor of claim 4, wherein responsive to a sum of a received pixel value of a pixel and the product of the predetermined sharpening strength and the sharpening value for the pixel value being greater than the weighted average pixel value, and the residual delta value being less than zero, the corrected pixel value for the received pixel is determined as a function of the residual delta value, the weighted average pixel value of the plurality of pixels in the second direction, the lowest pixel value from the pixel values of the plurality of neighboring pixels in the first direction, and a sum of the received pixel value and the product of the predetermined sharpening strength and the sharpening value for the received pixel value.

7. The image processor of claim 6, wherein responsive to the sum of the received pixel value of the pixel and the product of the predetermined sharpening strength and the sharpening value for the pixel value being less than the weighted average pixel value, and the residual delta value being greater than zero, the corrected pixel value for the received pixel is determined as a function of the residual delta value, the weighted average pixel value of the plurality of pixels in the second direction, the highest pixel value from the pixel values of the plurality of neighboring pixels in the first direction, and the sum of the received pixel value and the product of the predetermined sharpening strength and the sharpening value for the received pixel value.

8. The image processor of claim 1, wherein the raw input image data and the clamped pixel values are in a Bayer pattern.

9. The image processor of claim 1, wherein receiving pixel values of pixels of the color in the raw input image data includes receiving pixel values of pixels in colors of red, green, and blue, and wherein the first sharpening circuit is configured to generate sharpening values for pixel values of two of the colors but does not generate sharpening values for pixel values of a remaining one of the colors.

10. The image processor of claim 9, wherein the two colors are blue and red, and the remaining one of the colors is green.

11. A method comprising:
receiving pixel values of pixels of one or more colors in a raw input image data;
generating for each of the received pixel values a sharpening value that increases sharpness of the corresponding pixel;
generating a clamped value for each of the received pixel values as a function of the sharpening value for the corresponding pixel value, the clamped value limiting a degree of sharpening applied to each pixel value;
generating for each received pixel value a corresponding corrected pixel value as a function of the received pixel value and the clamped value associated with the received pixel value; and
outputting for each received pixel value the corresponding corrected pixel value.

12. The method of claim 11, further comprising:
generating a residual delta value for each received pixel value based on a difference between the sharpening value for each received pixel value and a product of a predetermined sharpening strength for all of the pixel values and the sharpening value; and
generating the clamped value for each of the received pixel values as a function of the residual delta value.

13. The method of claim 12, wherein generating the clamped value for each of the received pixel values is further generated according to pixel values of a plurality of neighboring pixels in a first direction that are of a same color as the pixel corresponding to the received pixel value, and pixel values of a plurality of neighboring pixels in a second direction that are of a different color than the pixel.

14. The method of claim 13, wherein generating the clamp value for each of the received pixel values comprises:
determining a highest pixel value from the pixel values of the plurality of neighboring pixels in the first direction;
determining a lowest pixel value from the pixel values of the plurality of neighboring pixels in the first direction; and
calculating a weighted average pixel value of the plurality of pixels in the second direction as a function of pixel values of the plurality of pixels and a white balance gain;

wherein the clamped value for each of the received pixel values is generated as a function of the highest pixel value, the lowest pixel value, and the weighted average pixel value that corresponds to the received pixel value.

15. The method of claim 14, wherein generating for each received pixel value the corresponding corrected pixel value comprises:
summing the received pixel value, the product of the predetermined sharpening strength and the sharpening value for the pixel value, and the clamped value for the received pixel value.

16. The method of claim 14, further comprising:
responsive to a sum of a received pixel value of a pixel and the product of the predetermined sharpening strength and the sharpening value for the pixel value being greater than the weighted average pixel value, and the residual delta value being less than zero, the corrected pixel value for the received pixel is determined as a function of the residual delta value, the weighted average pixel value of the plurality of pixels in the second direction, the lowest pixel value from the pixel values of the plurality of neighboring pixels in the first direction, and a sum of the received pixel value and the product of the predetermined sharpening strength and the sharpening value for the received pixel value.

17. The method of claim 16, further comprising:
wherein responsive to the sum of the received pixel value of the pixel and the product of the predetermined sharpening strength and the sharpening value for the pixel value being less than the weighted average pixel value, and the residual delta value being greater than zero, the corrected pixel value for the received pixel is determined as a function of the residual delta value, the weighted average pixel value of the plurality of pixels in the second direction, the highest pixel value from the pixel values of the plurality of neighboring pixels in the first direction, and the sum of the received pixel value and the product of the predetermined sharpening strength and the sharpening value for the received pixel value.

18. The method of claim 11, wherein the raw input image data and the clamped pixel values are in a Bayer pattern.

19. The method of claim 11, wherein receiving pixel values of pixels of the one or more colors in the raw input image data includes receiving pixel values of pixels in colors of red, green, and blue, and wherein sharpening values for pixel values of two of the colors are generated but sharpening values for pixel values of a remaining one of the colors are not generated.

20. A system comprising:
an image sensor comprising configured to capture an image data;
an image processor comprising:
a first sharpening circuit configured to:
receive pixel values of pixels of a color in a raw input image data; and
generate for each of the received pixel values a sharpening value that increases sharpness of the corresponding pixel;
a sharpening clamp circuit coupled to the first sharpening circuit and configured to receive the sharpening value for each of the received pixel values from the first sharpening circuit, and generate a clamped value for each of the received pixel values as a function of the sharpening value for the corresponding pixel value, the clamped value limiting a degree of sharpening applied to each pixel value; and a summation circuit coupled to the first sharpening circuit and the sharpening clamp circuit, the summation circuit configured to generate for each received pixel value a corresponding corrected pixel value as a function of the received pixel value and the clamped value associated with the received pixel value, and output the corresponding corrected pixel value.

\* \* \* \* \*

UNITED STATES PATENT AND TRADEMARK OFFICE
CERTIFICATE OF CORRECTION

PATENT NO. : 11,176,643 B1
APPLICATION NO. : 16/865883
DATED : November 16, 2021
INVENTOR(S) : Sheng Lin It is certified that error appears in the above-identified patent and that said Letters Patent is hereby corrected as shown below:

In the Claims

Column 20, Claim 20, Line 51: Delete "comprising"

Signed and Sealed this
Sixteenth Day of August, 2022

Katherine Kelly Vidal
*Director of the United States Patent and Trademark Office*